United States Patent

Gardner

[15] 3,701,904
[45] Oct. 31, 1972

[54] VEHICLE HEADLIGHT SWITCH WITH TIME DELAY

[72] Inventor: Donald J. Gardner, 3741 Penbrook Lane, Flint, Mich. 48507

[22] Filed: June 9, 1970

[21] Appl. No.: 44,685

[52] U.S. Cl............................307/10 BP, 200/153 F
[51] Int. Cl..............................................B60g 1/04
[58] Field of Search.............307/10 LS, 10 BP, 10 R; 315/8.2; 200/153 F

[56] References Cited

UNITED STATES PATENTS

| | | | |
|---|---|---|---|
| 1,687,291 | 10/1928 | Graham | 200/153 F |
| 3,374,394 | 3/1968 | Miller | 307/10 BP X |
| 3,211,951 | 10/1965 | Skinner et al. | 307/10 BP X |
| 2,931,918 | 4/1960 | Shapiro | 307/10 BP |
| 3,244,899 | 4/1966 | Merle | 307/10 BP |

*Primary Examiner*—Robert K. Schaefer
*Assistant Examiner*—William J. Smith
*Attorney*—Dennison, Dennison, Townshend & Meserole

[57] ABSTRACT

A control system is provided for the manual activation of a time delay circuit which will cause the head lamps of a vehicle to be energized for a predetermined length of time. It incorporates a head lamp control relay controlled by a transistor switch incorporating an RC time constant to provide the desired delay and a momentary on switch to activate the system. The momentary on switch may function in cooperation with the dome lamp switch.

5 Claims, 5 Drawing Figures

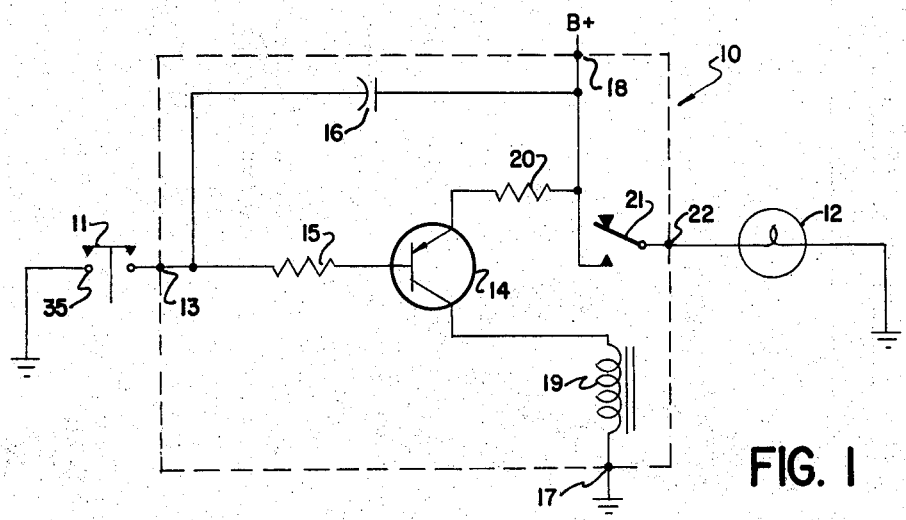
FIG. 1
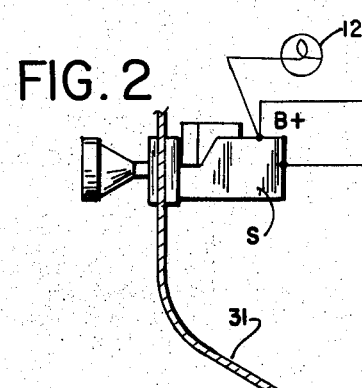
FIG. 2
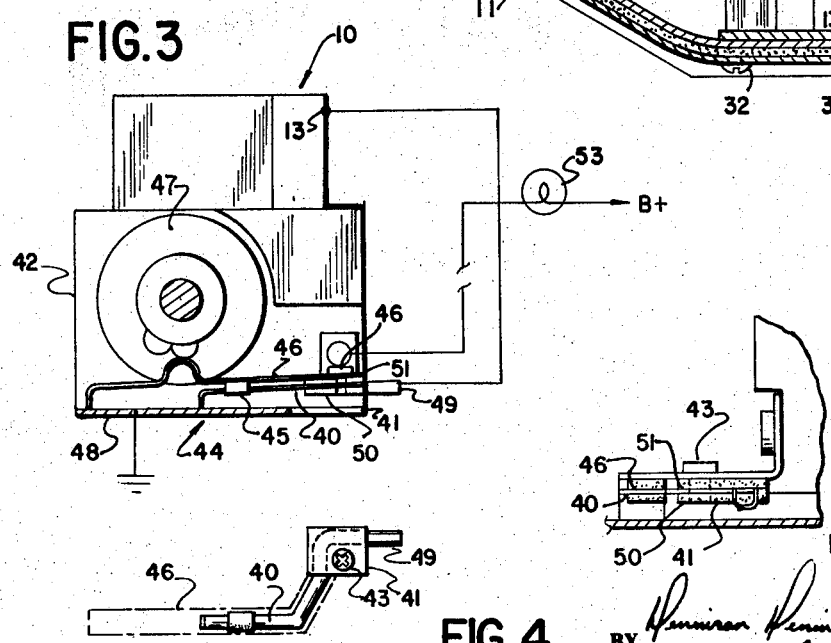
FIG. 3
FIG. 4
FIG. 5
INVENTOR
DONALD J. GARDNER
BY *Dennison, Dennison, Townsend & Meserole*
ATTORNEYS

VEHICLE HEADLIGHT SWITCH WITH TIME DELAY

This invention relates to a control means for a light circuit which when activated maintains selected lights energized for a predetermined length of time. More specifically, this invention when incorporated in an automobile, aircraft, or boat lighting system will allow the operator to turn on the headlights of the vehicle while the ignition and the normal light control switches are off and the headlights will remain on for a duration of time sufficient for the operator to reach a remote point before they automatically extinguish.

Automobiles are frequently parked after dark in poorly lighted or remote areas and the operator must go some distance before reaching an illuminated area. From a standpoint of safety, both to see obstacles in ones path and to keep away malicious persons, it is advantageous to retain the immediate area in which the automobile is parked illuminated for a short time, allowing the operator to reach his objective. This is especially important in unlit garages remote from a main house.

Prior vehicle mounted time delay control means for a light circuit are automatic when certain vehicle switches are properly placed, that is, they require that the vehicle lights be left on and the ignition turned off, creating a situation wherein the utility provided by the device is limited and not within the operators direct control. Prior control devices incorporated in vehicle light switches require a special light control switch in place of the normally used switch and do not provide a means whereby the time delay circuit can be readily adapted to an existing light control system.

It is, therefore, an object of this invention to provide a manually activated control circuit to maintain the headlamps of an automobile energized for a predetermined time with the normal control switches in the off position.

Another object of this invention is to provide a simple accessory circuit module which can be attached to a conventional lighting system of a vehicle and which will, when activated, maintain the headlamps energized for a predetermined time.

Another object of this invention is to provide a simple accessory circuit of the type previously described which can be attached to a conventional lighting system of a vehicle in a manner that will allow the standard light control knob to activate the delay circuitry.

A further object of this invention is to provide a simple accessory circuit of the type previously described which can be incorporated in a conventional lighting system of an automobile with a minimum amount of alteration to said automobile, and which is simple in construction, inexpensive to manufacture and is safe and efficient in use.

With these objectives in view the invention will best be understood by reference to the following specification and the illustrations in the accompanying drawings, in which:

FIG. 1 is a schematic circuit diagram of a time delay control system embodying the invention;

FIG. 2 is a sectional view through a vehicle dashboard showing the preferred embodiment of the invention incorporating a circuit mounting means having an integral control switch and configured so that the accessory may be incorporated in a vehicle with a minimum of alteration to the vehicle;

FIG. 3 is a front view of an alternate embodiment of the invention in which the control switch of the invention is incorporated in a standard vehicle lighting system control switch; and FIG. 4 is a top view of the adaptive switching means forming part of the FIG. 3 alternate embodiment of the invention;

FIG. 5 is an end view of the adaptive switching means shown in FIGS. 3 and 4.

Referring more specifically to the drawings wherein like parts are designated by the same reference characters, FIG. 1 is a schematic presentation of the circuitry of the invention consisting of an electronic module 10 and control switch 11 connected to the vehicle headlamps 12. The electronics module 10 consists of a standard normally opened relay and a transistor switch with an RC timing network. The circuit functions when the control switch 11 is momentarily closes, applying ground potential to terminal 13. This biases transistor 14 on via resistance 15 and charges the capacitor 16. When the transistor conducts, current flows between ground terminal 17 and B+ terminal 18 via relay coil 19 and emitter resistance 20, energizing the relay coil 19. When the control switch 11 is released, the charge on capacitor 16 maintains the bias on the transistor, causing it to continue to conduct. When the charge on capacitor 16 is dissipated, the transistor stops conducting and the relay is de-energized. While the relay is energized relay contacts 21 are closed and the load, such as headlamp 12, is connected through terminal 22 to B+ via terminal 18.

FIG. 2 represents the preferred embodiment of the invention wherein the module 10 and control switch 11 are assembled in a mounting 30. This mounting is configured so that it can be slipped over the lower portion of the automobile's instrument panel 31 and anchored thereto by one or more screws 32. The configuration of the mounting is such that the control switch 11 is supported in a position where it may be easily reached by the vehicle operator and the electronic module is located so that the required electrical connections may be simply accomplished. A padded spacer 33 is provided between the mounting 30 and instrument panel 31 to prevent chafing of the instrument panel by the mounting. Ideally, the mounting is constructed of a conductive material to simplify wiring installation, that is, the mounting will be grounded to the vehicle chassis via screws 32, the control switch ground terminal 35 will be electrically connected to the mounting means as will ground terminal 17 of the electronic module. Terminal 13 of the electronic module is connected to the control switch via a wire 34 which is affixed to the mounting means during manufacture. In this embodiment, the only electrical connections which have to be made when incorporating the accessory in the automobile lighting system is a connection between terminal 18 of the electronic module and any point of positive voltage within the electrical system of the automobile and a connection between terminal 22 and the headlamp terminal on the normal light control switches or other convenient connection point.

FIG. 3 represents an alternate embodiment of the invention wherein the control switch of the invention is replaced by a switching means incorporated in the normal vehicle lighting system switch. This switching means consists of a flat spring contact arm 40 which is molded in an insulated spacing block 4 and retained in the forward portion of the switch housing 42 by a self-tapping screw 43. The end portion of the contact spring located within the switch housing is bent in a right angle to form a contact point 44 and an insulator 45 is positioned around the contact arm 40 near the right angle bend such that it will be in contact with the existing dome lamp switch arm 46 such that when the dome lamp 53 is turned on by rotation of the light control knob 47 and its associated cams, the dome lamp switch arm 46 will cause the contact arm 40 to contact the grounding plate 48 and activate the time delay system in the electronic module 10 which may be remotely located or affixed directly to the side of the standard lighting switch housing. The end of the contact arm 40 extending out of the block 41 and switch housing 42 is formed as a crimp type connector 49 to facilitate electrically connecting a wire between the switch and terminal 13 of the module 10. It should be understood, however, that any type of terminal connector may be employed.

The flat spring contact arm 40 is configured similar to the dome lamp switch arm 46, as can be seen in FIG. 4, so that when installed it occupies a position between all but the contact portion of the dome lamp switch arm 46 and the ground plate 48. The insulated spacing block 41 contains a bore 50 passing completely through the block to receive the self taping mounting screw 43. The bore 50 is positioned to be in alignment with the hole 51 normally provided in the dome lamp switch arm 46 when the contact arm 40 is placed properly. It should also be noted in FIG. 4 that the contact arm 40 is routed through the spacing block 41 to avoid contact with the mounting screw 43 and to prevent twisting of the arm within the block.

Referring to FIG. 5, it can be seen that the mounting screw 43 passes through the hole 51 in the dome lamp switch arm 46 before it enters the bore 50 in the mounting block. With this arrangement the flat spring contact arm 40 is securely and properly positioned by a single screw, however, for increased rigidity a nut and bolt on a plurality of nuts and bolts or screws could be employed.

Although the control system of this invention has been described with respect to preferred embodiments thereof, it is to be understood that it is not to be so limited since changes can be made therein which are within the skill of those working in the art. The scope of this invention is defined by the appended claims.

What I claim as my invention and desire to protect by Letters Patent of the United States is:

1. A control system for the exterior lighting system of a vehicle which includes headlamps, a direct current power source, a common ground circuit, a control switch, and means interconnecting said lighting system elements, the improvement comprising, a time delay circuit including a normally open relay switch connected between said power source and said headlamps, a coil for activating said relay switch, a transistor switch responsive to said power source for controlling current to said coil, resistive means for creating a voltage differential to cause said transistor switch to conduct, capacitive means to store an electrical charge from said power source to enable said transistor switch to conduct for a period of time after removal of an activating potential from said power source, a momentary on switch including a first and second terminal for providing connection between said ground and said resistive means and said capacitive means to cause said transistor switch to conduct and said capacitive means to store an electric charge, a movable contact in said normally open relay switch responsive to current flow in said coil; a fixed contact in said normally open relay switch for engagement by said movable contact when said coil is energized; a housing for said time delay circuit including a first terminal to provide electrical connection between said movable contact and said headlamps, a second terminal to provide electrical connection between said fixed contact and said power source, a third terminal to provide connection between said relay coil and said ground, and a fourth terminal to provide connection between said resistive means and said capacitive means and said momentary on switch, electrically conductive mounting means affixed to said housing for securing said housing to said vehicle, said mounting means having a U-shape for receiving the lower edge of a vehicle dashboard including holes for receiving mounting screws and an extension for supporting said momentary on switch in a position accessible to the operator; a conductive threaded terminal electrically connected to said coil for engaging one of said mounting screws; an insulated electrical conductor connected between said resistive means and said capacitive means and said momentary on switch first terminal, an electrical conductor connected between said momentary on switch second terminal and said electrically conductive mounting means, and a resilient pad between said electrically conductive mounting means and the normally observable surface of said dashboard for preventing abrasive disfigurement of said dashboard.

2. A control system for the exterior lighting system of a vehicle including headlamps, a direct current power source, a common ground circuit, a control switch having a flat spring cam operated grounding means for dome lamps, and means interconnecting said lighting system elements, the improvement comprising, a time delay circuit including a normally open relay switch connected between said power source and said headlamps, a coil for activating said relay switch, a transistor switch responsive to said power source for controlling current to said coil, resistive means for creating a voltage differential to cause said transistor switch to conduct, and capacitive means to store an electrical charge from said power source to enable said transistor switch to conduct for a period of time after removal of an activating potential from said power source, and a contact cooperating with, but electrically insulated from said cam operated dome lamp switch for providing connection between said ground and said resistive means and said capacitive means to cause said transistor switch to conduct and said capacitive means to store an electric charge.

3. A control system as defined in claim 2, and further including insulated means for securing said contact to said cam operated dome lamp switch.

4. A control system as defined in claim 2, wherein said contact comprises a flat spring having one end bent 90° to form a contact point and the other end defining a crimp type electrical terminal; and further including an insulated block molded about said flat spring adjacent to said electrical terminal having a bore perpendicular to the plane of said flat spring; a spacer of insulating material molded about said flat spring adjacent to said contact; screw means for securing said insulated block to said cam operated dome lamp switch via said bore such that activation of said dome lamp switch causes said contact to be placed in electrical engagement with said ground and; an insulated electrical conductor connected between said crimp type electrical terminal and said resistive means and said capacitive means.

5. A control system as defined in claim 4, and further including a movable contact in said normally open relay switch responsive to current flow in said coil; a fixed contact in said normally open relay switch for engagement by said movable contact when said coil is energized; a housing for said time delay circuit including first terminal means to provide electrical connection between said movable contact and said headlamps, second terminal means to provide electrical connection between said fixed contact and said power source, third terminal means to provide connection between said relay coil and ground, and fourth terminal means supported by said housing and interposed in said insulated electrical conductor and; mounting means for securing said housing to said control switch.

* * * * *